(No Model.)
P. WRIGHT.
INSULATION FOR UNDERGROUND WIRES.
No. 497,852.  Patented May 23, 1893.
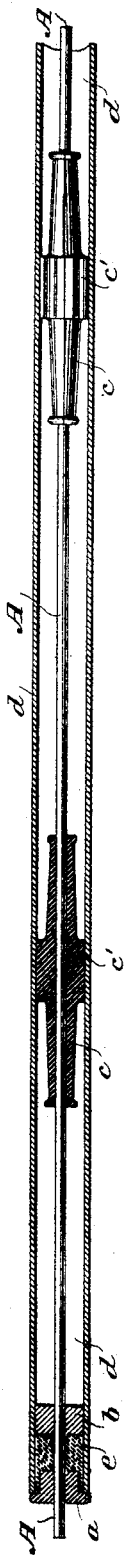
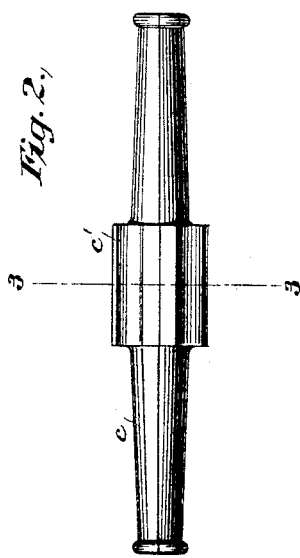
Witnesses
Geo. W. Breck.
C. E. Ashley.
Inventor
Parvin Wright
By his Attorney
Charles J. Kintner

UNITED STATES PATENT OFFICE.

PARVIN WRIGHT, OF DENVER, COLORADO.

INSULATION FOR UNDERGROUND WIRES.

SPECIFICATION forming part of Letters Patent No. 497,852, dated May 23, 1893.

Application filed January 27, 1890. Renewed August 18, 1892. Serial No. 443,385. (No model.)

*To all whom it may concern:*

Be it known that I, PARVIN WRIGHT, a citizen of the United States, residing at Denver, county of Arapahoe, and State of Colorado, have made a new and useful Invention in Electrical Conductors, of which the following is a specification.

My invention is directed particularly to insulated electrical conductors for use in connection with systems of underground electrical distribution, and although it is particularly applicable to this type of electrical distribution it is equally adapted for use wherever good insulation is required.

My invention will be fully understood by referring to the accompanying drawings, in which—

Figure 1 is a longitudinal sectional view of my improved form of conductor. Fig. 2 is a side elevational view of a longitudinally divided insulating washer or thimble constituting one of the essential features of my invention. Fig. 3 is a transverse sectional view of the washer or thimble taken on line 3 3 Fig. 2.

$d$ is a tube or pipe, made preferably of iron, or any material which is not readily impregnated with water, and A is a conductor of electricity either bare or insulated as preferred, said conductor being surrounded throughout its length by a series of longitudinally divided insulating washers or thimbles $c$, adapted to fit snugly about it and within the tube or pipe $d$. At the end of each section of pipe I insert washers $b$ of good insulating material, and surround the conductor with packing $e$, held in place by a sealing plug $a$. The conductor may be thus laid in a continuous pipe, or in a pipe made up of similar sections sealed together end to end. The air is exhausted from each of the sections of the pipe by any preferred means before it is sealed, thereby affording a rarefied medium which is a poor conductor, and preventing, as far as possible, the condensation of moisture on the inner surface of the tube $d$. The washers or thimbles $c$ are fluted as shown at $c'$ and are divided longitudinally so as to be readily put in place, and, when so put in place, held there by any preferred means. These washers or thimbles $c$ are of substantially the same exterior diameter at their points of support as the inner diameter of the tube $d$ so that when in position as shown in Fig. 1 they fit comparatively snugly within the tube and maintain the conductor A in the axial center of said tube.

I am aware that it is old to inclose a pair of bare conductors in an iron tube and to support said conductors near the center of the tube by insulating thimbles, the conductors being otherwise insulated from the sides of the tubes by asphalt or other equivalent insulating material.

I am also aware that it is old in the art to exhaust the air from a tube or conduit which incloses a centrally supported conductor, and to seal the ends of such an exhausted tube, and I make no claim broad enough to include such constructions, my claims hereinafter made being directed to the specific constructions enumerated. I am not aware, however, that anyone has ever heretofore surrounded an electrical conductor, located within a pipe or tube, by a series of longitudinally divided insulating washers which fit snugly within the tube and sustain the conductor in a central or axial position in relation thereto.

Having thus described my invention, what I claim, and desire to secure by Letters Patent of the United States, is—

1. An electrical conductor inclosed in a tube hermetically sealed at both ends, and surrounded at intervals by divided insulating washers or thimbles, having substantially the same diameter as the inner diameter of the tube substantially as described.

2. An electrical conductor inclosed in a tube and supported at intervals by longitudinally divided insulating washers or thimbles having substantially the same diameter as the inner diameter of the tube, substantially as described.

3. An electrical conductor inclosed in a tube and supported at intervals by divided washers or thimbles resting against the inner face of the tube and at its ends by additional washers, in combination with water-tight packing and seals, the conductor being sustained by the washers in the axial center of the tube substantially as described.

4. An electrical conductor surrounded by a series of longitudinally divided insulating washers, which when in position rest against the inner wall of a surrounding or inclosing tube whereby the conductor is maintained in the axial center of the tube substantially as described.

In testimony whereof I affix my signature in presence of two witnesses.

PARVIN WRIGHT.

Witnesses:
L. C. NORTHROP,
A. W. BROWNELL.